United States Patent [19]

Mayo

[11] Patent Number: 5,646,214

[45] Date of Patent: Jul. 8, 1997

[54] COATING COMPOSITION CONTAINING POLYESTER POLYMERS WITH TERMINAL CARBAMATE GROUPS AND POLYMERIC POLYOL DERIVED FROM ETHYLENICALLY UNSATURATED MONOMERS

[75] Inventor: Michael A. Mayo, Pittsburgh, Pa.

[73] Assignee: PPG Industries, Inc., Pittsburgh, Pa.

[21] Appl. No.: 702,376

[22] Filed: Aug. 23, 1996

Related U.S. Application Data

[62] Division of Ser. No. 562,234, Nov. 21, 1995, Pat. No. 5,593,733.

[51] Int. Cl.$^6$ ................................................. C08G 63/91
[52] U.S. Cl. ...................... 525/10; 528/272; 528/300; 528/361; 525/41; 525/400; 525/401; 525/441; 525/443; 525/445; 525/450; 525/472; 525/540
[58] Field of Search ........................ 528/272, 300, 528/361; 525/10, 41, 400, 401, 441, 443, 445, 450, 472, 540

[56] References Cited

U.S. PATENT DOCUMENTS

| | | | |
|---|---|---|---|
| 3,464,938 | 9/1969 | Nordstrom | 260/21 |
| 5,336,566 | 8/1994 | Rehfuss | 428/524 |
| 5,356,669 | 10/1994 | Rehfuss et al. | 427/407.1 |
| 5,373,069 | 12/1994 | Rehfuss et al. | 525/456 |
| 5,412,049 | 5/1995 | Argyropoulos et al. | 526/312 |
| 5,451,656 | 9/1995 | Menovcik et al. | 528/288 |

FOREIGN PATENT DOCUMENTS

| | | |
|---|---|---|
| 257848 | 3/1988 | European Pat. Off. . |
| 594068 | 4/1994 | European Pat. Off. . |
| 594142 | 4/1994 | European Pat. Off. . |
| 710676 | 5/1996 | European Pat. Off. . |
| 710707 | 5/1996 | European Pat. Off. . |
| WO94/10211 | 5/1994 | WIPO . |
| WO94/10212 | 5/1994 | WIPO . |
| WO94/10213 | 5/1994 | WIPO . |
| WO95/22582 | 8/1995 | WIPO . |

*Primary Examiner*—Samuel A. Acquah
*Attorney, Agent, or Firm*—William J. Uhl

[57] ABSTRACT

An adherent film-forming composition comprising a carbamate-functional polyester polymer or oligomer, a hydroxy functional polymer derived from ethylenically unsaturated monomers and an aminoplast crosslinking agent is disclosed. The coating composition can be used to produce clear coats in composite color plus clear coatings exhibiting good levels of acid etch resistance as well as high intercoat adhesion. Also disclosed are a method of applying a composite color plus clear coating to a substrate and the coated article prepared by such a method.

18 Claims, No Drawings

COATING COMPOSITION CONTAINING POLYESTER POLYMERS WITH TERMINAL CARBAMATE GROUPS AND POLYMERIC POLYOL DERIVED FROM ETHYLENICALLY UNSATURATED MONOMERS

CROSS-REFERENCE TO RELATED APPLICATIONS

This is a division of application Ser. No. 08/562,234, filed Nov. 21, 1995 now U.S. Pat. No. 5,593,733. Reference is made to commonly assigned application Ser. No. 08/320, 793, filed Oct. 7, 1994, which is a continuation of application Ser. No. 07/968,795, filed Oct. 30, 1992, now abandoned; application Ser. No. 08/605,420, filed Feb. 22, 1996, which is a continuation of application Ser. No. 08/320,793; applications Ser. No. 08/329,915 and Ser. No. 08/345,918, filed Oct. 27, 1994 and Nov. 28, 1994, respectively, which are continuation applications of application Ser. No. 07/968, 786, filed Oct. 30, 1992, now abandoned; application Ser. No. 08/447,392, filed May 23, 1995, which is a division of application Ser. No. 08/236,912, filed Apr. 29, 1994, now abandoned, and application Ser. No. 08/494,905, filed Jun. 26, 1995 now U.S. Pat. No. 5,593,785.

FIELD OF THE INVENTION

The present invention relates to film-forming compositions containing polyester polymers with terminal carbamate groups in combination with hydroxyl functional polymers and crosslinking agents for said compositions, and to the use of such film-forming compositions as clear coats in color plus clear composite coatings.

BACKGROUND OF THE INVENTION

Coating compositions based on acrylic polymers and aminoplast crosslinking agents are particularly desirable as automotive top coats because they have excellent durability, hardness, gloss and appearance. However, such coating compositions, when used as clear coats in color plus clear composite coatings, are particularly susceptible to acid etching. Acid etching is a phenomenon associated with acidic rain water, which is common in many urban and industrial areas. When acidic rain water, also known as acid rain, accumulates on a horizontal section of an automobile such as a hood or trunk deck, it spots and can actually etch away the clear coat leaving a blemish that cannot be polished out. It has been found that acrylic polymers containing pendant or terminal carbamate groups can be cured with aminoplast crosslinking agents to give acid etch resistant clear coats. Publications that disclose such polymers are U.S. Pat. No. 5,356,669, U.S. Pat. No. 5,336,566, EPO 0,594,142 A1 and EPO 0,590,068 A1.

A problem associated with curable coating compositions based on acrylic polymers containing pendant carbamate groups and aminoplast curing agents is that the compositions do not have particularly good intercoat adhesion. This problem presents itself when the compositions are used as clear coats in composite color plus clear composite coatings, especially during repair procedures which involve applying the clear film-forming composition to a flawed area of a previously applied color plus clear composite coating. The clear coats can actually delaminate from underlying layers of film.

SUMMARY OF THE INVENTION

The adhesion problems associated with film-forming compositions based on acrylic polymers containing pendant carbamate groups and aminoplast curing agents can be alleviated by coating compositions comprising a polymer or oligomer containing repeating ester groups in the backbone and containing a plurality of terminal carbamate groups in combination with polymeric polyols and an aminoplast curing agent. The polyester polymer or oligomer and the polymeric polyols are present in amounts sufficient to impart good etch resistance and to increase intercoat adhesion, without adversely affecting the humidity resistance of the coating. The best balance of etch resistance and intercoat adhesion is achieved by using carbamate functional polyesters and acrylic polyols in combination with fully alkylated melamine. Specifically, the present invention provides an adherent film-forming composition comprising:

(a) 25 to 70 percent by weight of a polymer or oligomer containing repeating ester groups in the polymer or oligomer backbone and containing a plurality of terminal carbamate groups of the structure:

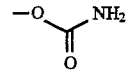

(b) 30 to 75 percent by weight of a hydroxyl functional polymer derived from ethylenically unsaturated monomers; and (c) 25 to 50 percent by weight of an aminoplast crosslinking agent;

the percentages by weight of (a) and (b) being based on total resin solids weight of (a) plus (b); the percentage by weight of (c) being based on total weight of resin solids in the film-forming composition. Preferably, the percentage by weight of (a) plus (b) is from 25 to 75 percent by weight and is based on the total weight of resin solids in the film-forming composition.

Also, the present invention provides a method of applying a composite color plus clear coating to a substrate in which the film-forming composition described above is the clear coat. Further, the present invention provides for coated articles prepared by the above described method.

DETAILED DESCRIPTION

The film-forming composition comprises a polymer or oligomer containing repeating ester groups in the backbone. The polymer or oligomer typically is an oligomeric polyester and/or a polymeric polyester. The polymers or oligomers having a plurality of ester groups in the backbone are prepared by a condensation or addition reaction in which the ester groups are repeating, i.e.,

A suitable polyester can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid.

Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1.

In the preferred embodiment, a polyester is prepared from an esterdiol such as 2,2'-dimethyl-3-hydroxypropyl-2,2'-dimethyl-3-hydroxypropionate and a triol such as trimethylolpropane.

The polyester has terminal carbamate groups of the structure:

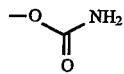

The carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can be incorporated into the polyester by a transcarbamalation reaction.

In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality the polyester polymers and oligomers may contain other functional groups such as hydroxyl, carboxylic acid and/or anhydride groups. The equivalent weight of the polyesters containing terminal carbamate groups will be from about 140 to 2500, based on equivalents of carbamate groups. The equivalent weight is a calculated value based on the relative amounts of the various ingredients used in making the polyester, and is based on the solids of the material.

The polyesters typically have weight average molecular weights of about 1000 to 30,000, preferably 1000 to 10,000 as determined by gel permeation chromatography using polystyrene as a standard.

The hydroxyl functional polymer derived from ethylenically unsaturated monomers can be represented by randomly repeating units according to the following formula:

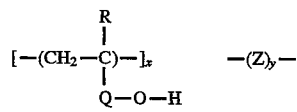

where R is H or $CH_3$; Z is a repeating unit derived from one or more different polymerizable ethylenically unsaturated monomers; and x is, on a weight basis, from 30 to 70 percent, y is, on a weight basis, from 30 to 70 percent, with the percentage of x plus y being equal to 100 percent. Q represents a divalent linking group, preferably —Q— is represented by —COO—Q'— where Q' is a divalent linking group. Q' can be a divalent aliphatic linking group, preferably of 2 to 8 carbon atoms, e.g., $C_2H_4$, $C_3H_6$, $C_4H_8$, and the like; or a divalent cycloaliphatic linking group, preferably of up to 8 carbon atoms, e.g., cyclohexyl, and the like. However, other divalent linking groups can be used, depending on the technique used to prepare the polymer.

Typically, the hydroxyl functional polymers derived from ethylenically unsaturated monomers are acrylic copolymers which are copolymers of one or more hydroxy alkyl esters of acrylic acid or methacrylic acid, and, optionally, one or more other polymerizable ethylenically unsaturated monomers. Examples of hydroxy alkyl esters are hydroxyethyl acrylate and methacrylate and hydroxypropyl acrylate and methacrylate.

Example of other polymerizable ethylenically unsaturated monomers include alkyl esters of acrylic or methacrylic acid including methyl acrylate, methyl methacrylate, ethyl methacrylate, butyl methacrylate, ethyl acrylate, butyl acrylate, and 2-ethylhexyl acrylate. Other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

The hydroxy functional polymer can be prepared by solution polymerization techniques in the presence of suitable initiators such as organic peroxides or azo compounds, for example, benzoyl peroxide or N,N-azobis (isobutyronitrile). The polymerization can be carried out in an organic solution in which the monomers are soluble by techniques conventional in the art. Alternatively, the hydroxy functional polymer can be prepared by aqueous emulsion or dispersion polymerization techniques well known in the art.

The hydroxy functional polymer typically has an equivalent weight of less than 5000, preferably within the range of 140 to 2500, based on equivalents of reactive hydroxyl groups. The equivalent weight is a calculated value based on the relative amounts of the various ingredients used in making the acrylic material and is based on the solids of the hydroxyl functional acrylic polymer.

In addition, the hydroxy functional polymer has a weight average molecular weight of from about 1000 to 30,000, preferably from about 2000 to 10,000 as determined by gel permeation chromatography using polystyrene as a standard.

The aminoplast crosslinking agents useful in the present invention are obtained from the reaction of formaldehyde with an amine and/or an amide. Melamine, urea, or benzoguanamine condensates are preferred. However, aminoplast condensates prepared from other amines or amides can be used, for example, aldehyde condensates of glycouril, which are useful in formulating powder coatings. Most often, formaldehyde is used as the aldehyde; however, other aldehydes such as acetaldehyde, crotonaldehyde, and benzaldehyde are also suitable.

The aminoplast crosslinking agent has a plurality of functional groups, for example, alkylated methylol groups, that are reactive with the terminal carbamate groups present in the polyester polymer or oligomer and with the hydroxyl groups associated with the polymeric polyol.

The preferred aminoplast crosslinking agent is a melamine-formaldehyde condensate that contains methylol groups that have been further etherified with an alcohol, preferably one that contains 1 to 6 carbon atoms. Any monohydric alcohol can be employed for this purpose, including methanol, ethanol, isobutanol, and cyclohexanol. Most preferably, a blend of methanol and n-butanol is used, resulting in a melamine-formaldehyde condensate that is, on average, 75 percent methylated and 25 percent butylated.

Most preferably, the aminoplast crosslinking agent is a fully alkylated aminoplast crosslinking agent. By the term "fully alkylated" is meant that the alkylol groups associated with the reaction product of an aldehyde with an amine and/or an amide have been etherified to an extent that the alkoxy groups make up at least eighty (80) percent by weight of the functional groups.

A fully alkylated aminoplast crosslinking agent results in optimum intercoat adhesion.

The film-forming composition of the present invention typically has a calculated hydroxyl value of less than 70, preferably about 15 to about 50, based on the solid weight of the film-forming composition. The calculated hydroxyl value is calculated from the relative amounts of the various ingredients used in making the film-forming composition, rather than from experimental titration measurement. Hydroxyl values greater than 70 are undesirable because they result in cured films with poor acid etch resistance.

For the polyester polymer or oligomer with terminal carbamate groups, amounts greater than 70 percent by weight are undesirable because the humidity resistance of the cured film suffers; whereas amounts less than 25 percent by weight are undesirable due to poor acid etch resistance of the cured film. For the hydroxy functional polymer, amounts greater than 75 percent by weight are undesirable because the acid etch resistance of the cured film suffers; whereas amounts less than 30 percent by weight are undesirable because humidity resistance of the cured film suffers. For the aminoplast crosslinking agent, amounts greater than 50 percent by weight are undesirable because of poor acid etch resistance in the cured film; whereas amounts less than 25 percent by weight are undesirable because of poor cured film properties.

Optionally, a diluent can be present in the film-forming composition that serves to reduce the viscosity of the coating composition. If the coating composition is solvent-borne, the diluent typically comprises an organic solvent. Examples of suitable solvents include alcohols such as ethanol, isopropanol, n-butanol, and the like; esters such as n-butyl acetate, n-hexyl acetate, pentyl propionate, and the like; ethers such as the monoethyl, monobutyl and monohexyl ethers of ethylene glycol, and the like; ketones such as methyl ethyl ketone, methyl isobutyl ketone, diisobutyl ketone, and the like; aromatic hydrocarbons such as xylene, or toluene, and the like; aliphatic or alicyclic hydrocarbons such as the various petroleum naphthas and cyclohexane; and mixtures thereof.

The film-forming composition can also be waterborne. For example, the composition can contain an acid functional polymer that can be neutralized with amines and dissolved or dispersed in water. Also, it is possible to prepare an aqueous dispersion of the polymer of the film-forming composition in microparticulate form by imparting high stress using a homogenizer. This latter technique is described in U.S. Pat. No. 5,071,904.

If the coating composition is waterborne, the diluent can optionally contain water-soluble organic cosolvents, for example alcohols with up to about eight carbon atoms such as methanol, ethanol, propanol, butanol, isobutanol, or mixtures thereof; or glycol ethers such as the monoalkyl ethers of ethylene glycol, diethylene glycol, propylene glycol, and the like.

When present, diluents are typically used at a level of up to about 50 percent, preferably up to about 40 percent by weight, based on the total weight of the film-forming composition.

The film-forming composition can also be used in particulate form, i.e., as a powder coating, in which the acrylic polymer and the oligomer or polymer containing the repeating ester groups are chosen such that they have a glass transition temperature (Tg) greater than 60° C. These materials can then be combined with an aldehyde condensate of glycouril, as previously mentioned, to form a powder film-forming composition.

The coating composition is a thermosetting composition and typically contains catalysts to accelerate the curing reactions. Typically, the catalysts are acidic materials. Sulfonic acids, substituted sulfonic acids and amine neutralized sulfonic acids are preferred, for example, p-toluene sulfonic acid, dodecyl benzene sulfonic acid, dinonylnaphthalene disulfonic acid, and the like. The catalyst is usually present in an amount of from 0.50 to 5.0 percent, preferably from 0.5 to 1.0 percent, the percentages based on the total weight of resin solids in the coating composition.

The coating composition can contain other optional ingredients, such as co-reactive resinous materials; plasticizers; anti-oxidants; UV light absorbers; surfactants; flow control agents; anti-settling agents; and the like. When present, these materials are generally used at a level up to 25 percent, preferably up to 10 percent by weight, the percentages based on the total weight of resin solids in the coating composition.

The film-forming composition can be applied to any of the various substrates to which it adheres. Specific examples of suitable substrates include metals, wood, glass, cloth, plastic, foam, elastomeric substrates, and the like. Typically, the substrate is metal or plastic. Optionally, the substrate could have been previously coated with a primer coating composition, or with a pigmented basecoat and the film-forming composition of the present invention applied as a clear coat over the pigmented base coat to form a color plus clear composite coating.

The compositions can be applied by conventional means including brushing, dipping, flow coating, spraying, and the like. Preferably, they are applied by spraying. The usual spray techniques and equipment for air-spraying or electrostatic spraying can be used.

When the film-forming composition is used as a clear coat in a color plus clear composite coating, pigmented base coat is first applied to a substrate at a uniform film thickness of from about 0.25 to about 1.5 mils. The base coat is then "flashed," that is, it is left to stand at temperatures ranging from the ambient temperature to 80° C. for about 10 seconds to 30 minutes, before another coating composition is applied to it. Then, typically, the clear coating composition of the present invention is applied over the coated substrate in one or more coats to a uniform film thickness from 0.5 to 5.0 mils. The substrate is then flashed again and finally baked until the film is cured, typically for about 20 minutes to about 40 minutes at from about 100° C. to about 200° C. to produce the coated article.

The base coating compositions are those well known in the art as described, for example, in U.S. Pat. No. 4,681,811, column 1, line 56 to column 4, line 2.

Illustrating the invention are the following examples that are not to be considered as limiting the invention to their details. All parts and percentages in the examples as well as throughout the specification are by weight unless otherwise indicated.

EXAMPLE A

A hydroxyl functional acrylic copolymer was prepared from the following ingredients:

| Ingredients | Weight in parts |
| --- | --- |
| Initial Charge | |
| xylene | 10.7 |
| SOLVESSO 100[1] | 10.7 |
| isobutanol | 4.3 |
| Charge I | |
| hydroxypropyl acrylate | 40.0 |
| butyl methacrylate | 19.0 |
| butyl acrylate | 19.0 |
| styrene | 20.0 |
| acrylic acid | 2.0 |
| t-dodecyl mercaptan | 0.5 |
| Charge II | |
| xylene | 8.7 |
| SOLVESSO 100 | 6.4 |
| VAZO 67[2] | 5.0 |
| Charge III | |
| SOLVESSO 100 | 1.1 |
| VAZO 67 | 0.4 |
| Charge IV | |
| SOLVESSO 100 | 1.1 |
| VAZO 67 | 0.4 |

[1]aromatic solvent mixture available from Exxon Chemical Co.
[2]2,2'-dimethylazobis(isobutyronitrile) available from E.I. du Pont de Nemours & Co., Inc.

The initial charge was added to a 5-liter round bottom 4-neck flask equipped with mechanical agitation, nitrogen inlet, reflux condenser, and two dropping funnels. The charge was heated under a nitrogen blanket to reflux (115° C.). At reflux, Charges I and II were simultaneously and uniformly added over a two hour period maintaining reflux conditions. Upon completion of Charges I and II, Charge III was added and the reaction held for one hour. Charge IV was added and the reaction held one more hour. The polymer was characterized as having 69% solids, hydroxy value of 95, and peak molecular weight of 7000.

EXAMPLE B

A carbamate functional polyester polymer was prepared from the following ingredients:

| Ingredients | Weight in parts |
| --- | --- |
| 2,2-dimethyl-3-hydroxypropyl-2,2-dimethyl-3-hydroxypropionate | 196.8 |
| deionized H$_2$O | 10.0 |
| trimethylolpropane | 42.9 |
| butyl stannoic acid | 0.6 |
| triphenylphosphite | 0.8 |
| deionized H$_2$O | 3.0 |
| methylhexahydrophthalic anhydride | 158.3 |
| deionized H$_2$O | 10.0 |
| DOWANOL PM[3] | 3.0 |
| butyl stannoic acid | 0.5 |
| triphenylphosphite | 0.5 |
| DOWANOL PM | 2.0 |
| DOWANOL PM carbamate (37% solution in DOWANOL PM)[4] | 318.9 |
| DOWANOL PM | 10.0 |
| DOWANOL PM | 105.0 |

[3]1-methoxy-2-propanol available from DOW Chemical Co.
[4]Reaction product of DOWANOL PM and urea The first ingredient was charged to a suitable reactor equipped with a glycol recovery column. Deionized H$_2$O was added to the reactor as a rinse for the first ingredient. Trimethylolpropane, butyl stannoic acid, and triphenylphosphite were then added to the reactor, followed by a deionized H$_2$O rinse. Methylhexahydrophthalic anhydride, with a subsequent deionized H$_2$O rinse, was then added to the reactor followed by heating the reaction mixture to 77° C. and sparging with nitrogen for 20 minutes. The reaction mixture temperature was then raised to 210° C. and H$_2$O was removed from the reactor with the nitrogen sparge. The reaction was continued until an acid value of 10.2 was obtained and the batch was then cooled to 140° C. The intermediate resin had a hydroxyl value of 156.6. DOWANOL PM and butyl stannoic acid were added to the reactor as a slurry, followed by addition of triphenylphosphite and a DOWANOL PM rinse. The DOWANOL PM carbamate solution was then added to the reactor over a period of 4 hours. During the addition, DOWANOL PM was distilled from the reactor under reduced pressure. Upon completion of the addition of the DOWANOL PM carbamate solution a DOWANOL PM rinse was added to the reactor. The reaction was continued until DOWANOL PM evolution stopped. A sample of resin (90 parts by weight) was removed from the reactor; the remaining resin was diluted with DOWANOL PM. The resin prior to dilution had a residual hydroxyl value of 19.4 and an acid value of 8.5. After dilution, the resin had a measured solids content of 71.2% and a Gardner-Holt viscosity of Z1+. The carbamate functional polyester polymer had an Mn (number average molecular weight) of 720 and an Mw (weight average molecular weight) of 2220 as determined by gel permeation chromatography using a polystyrene standard.

EXAMPLE C (Comparative)

A carbamate functional acrylic polymer was prepared from the following ingredients:

| Ingredient | Weight in Parts |
| --- | --- |
| EXXATE 600[5] | 478.4 |
| butyl acetate | 478.4 |
| LUPERSOL 555M60[6] | 63.98 |
| EXXATE 600 | 11.20 |
| butyl acetate | 11.20 |
| hydroxypropyl acrylate | 512.00 |
| butyl methacrylate | 742.40 |
| methyl styrene dimer | 25.60 |
| EXXATE 600 | 64.00 |
| butyl acetate | 64.00 |
| LUPERSOL 555M60 | 21.33 |
| EXXATE 600 | 11.20 |
| butyl acetate | 11.20 |
| butyl stannoic acid | 2.55 |
| triphenylphosphite | 2.55 |
| DOWANOL PM carbamate (37% solution in DOWANOL PM) | 1413.74 |
| DOWANOL PM | 314.00 |
| ethyl-3-ethoxypropionate | 314.00 |

[5]Oxo-hexylacetate available from Exxon Co.
[6]t-amyl peroxyacetate available from Atochem North America The first two ingredients were charged to a suitable reactor under a nitrogen blanket and heated to reflux. The next three ingredients were mixed together and added to the reactor at a constant rate over 3.5 hours. Addition of a mixture of hydroxypropyl acrylate, butyl methacrylate, methyl styrene dimer, EXXATE 600, and butyl acetate was begun 15 minutes after the beginning of the first addition and added at a constant rate over 3 hours. After completion of the above additions the reaction was held at reflux for 1 hour. The next three ingredients were then added to the reactor over a period of 0.5 hour. The reaction was continued at reflux for a period of 2 hours. Solvent was then removed from the reaction mixture under reduced pressure, followed by the addition of the next two ingredients to the reactor. DOWANOL PM carbamate in DOWANOL PM solution was then added to the reactor over a period of 3 hours. During the addition, DOWANOL PM was removed from the reactor under reduced pressure. The reaction was continued under reduced pressure until DOWANOL PM evolution stopped. The resin prior to dilution had a residual hydroxyl value of 30.6. The resin was diluted with the last two ingredients. After dilution, the resin had a measured solids content of 69.2%, a Gardner-Holt viscosity of Z2-, a number average molecular weight of 3311, and a weight average molecular weight of 7851 as determined by gel permeation chromatography using a polystyrene standard.

The following examples (1–9) show the preparation of various clear film-forming compositions prepared with the polymers of Examples A, B, and C and aminoplast curing agent. The clear film-forming compositions were evaluated as clearcoats in composite color-plus-clear coatings.

EXAMPLE 1 (Comparative)

A clear film-forming composition was prepared by mixing together the following ingredients:

| Ingredient | Solid weight in grams | Solution weight in grams |
| --- | --- | --- |
| n-amyl propionate | — | 31.6 |
| methyl n-amyl ketone | — | 21.0 |
| TINUVIN 328[7] | 1.5 | 1.5 |
| TINUVIN 900[8] | 1.5 | 1.5 |
| polybutylacrylate | 0.4 | 0.7 |
| TINUVIN 123[9] | 1.0 | 1.0 |
| CYMEL 1130[10] | 35.0 | 35.0 |
| hydroxyl functional acrylic of EXAMPLE A | 65.0 | 92.9 |
| Neutralized DDBSA[11] | 0.55 | 1.8 |

[7]Substituted benzotriazole UV light stabilizer available from Ciba Geigy Corporation
[8]Substituted benzotriazole UV light stabilizer available from Ciba Geigy Corporation
[9]Sterically hindered amine light stabilizer available from Ciba Geigy Corporation
[10]A fully alkylated, mixed methoxy/butoxy functional aminoplast resin available from CYTEC Industries.
[11]Diisopropanol amine neutralized dodecyl benzene sulfonic acid solution The clear film-forming composition had a hydroxyl value of 85.3 based on total weight of resin solids in the clear film-forming composition. The solid resin weight ratio of Ex. A to Ex. B was 100/0 in the clear film-forming composition.

EXAMPLE 2

A clear film-forming composition was prepared by mixing together the following ingredients:

| Ingredient | Solid weight in grams | Solution weight in grams |
| --- | --- | --- |
| n-amyl propionate | — | 31.1 |
| methyl n-amyl ketone | — | 18.5 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 48.8 | 69.7 |
| carbamate functional polyester of EXAMPLE B | 16.2 | 21.2 |
| Neutralized DDBSA | 0.55 | 1.8 |

The clear film-forming composition had a hydroxyl value of 67.0 based on total weight of resin solids in the clear film-forming composition. The solid resin weight ratio of Ex. A to Ex. B was 75/25 in the clear film-forming composition.

EXAMPLE 3

A clear film-forming composition was prepared by mixing together the following ingredients:

| Ingredient | Solid weight in grams | Solution weight in grams |
| --- | --- | --- |
| n-amyl propionate | — | 36.6 |
| methyl n-amyl ketone | — | 12.5 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 32.5 | 46.4 |
| carbamate functional polyester of EXAMPLE B | 32.5 | 43.0 |
| Neutralized DDBSA | 0.55 | 1.8 |

The clear film-forming composition had a hydroxyl value of 48.6 based on total weight of resin solids in the clear film-forming composition. The solid resin weight ratio of Ex. A to Ex. B was 50/50 in the clear film-forming composition.

EXAMPLE 4

A clear film-forming composition was prepared by mixing together the following ingredients:

| Ingredient | Solid weight in grams | Solution weight in grams |
| --- | --- | --- |
| n-amyl propionate | — | 39.0 |
| methyl n-amyl ketone | — | 8.0 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 16.2 | 22.9 |
| carbamate functional polyester of EXAMPLE B | 48.8 | 64.6 |
| Neutralized DDBSA | 0.55 | 1.8 |

The clear film-forming composition had a hydroxyl value of 30.3 based on total weight of resin solids in the clear film-forming composition. The solid resin weight ratio of Ex. A to Ex. B was 25/75 in the clear film-forming composition.

EXAMPLE 5 (Comparative)

A clear film-forming composition was prepared by mixing together the following ingredients:

| Ingredient | Solid weight in grams | Solution weight in grams |
| --- | --- | --- |
| n-amyl propionate | — | 44.4 |
| methyl n-amyl ketone | — | 2.0 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| carbamate functional polyester of EXAMPLE B | 65.0 | 86.1 |
| Neutralized DDBSA | 0.55 | 1.8 |

The clear film-forming composition had a hydroxyl value of 12.0 based on total weight of resin solids in the clear film-forming composition. The solid resin weight ratio of Ex. A to Ex. B was 0/100 in the clear film-forming composition.

EXAMPLE 6 (Comparative)

A clear film-forming composition was prepared by mixing together the following ingredients:

| Ingredient | Solid weight in grams | Solution weight in grams |
| --- | --- | --- |
| n-amyl propionate | — | 31.1 |
| methyl n-amyl ketone | — | 22.0 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 48.8 | 69.7 |
| carbamate functional acrylic of EXAMPLE C | 16.2 | 24.7 |
| Neutralized DDBSA | 0.55 | 1.8 |

The clear film-forming composition had a hydroxyl value of 68.7 based on total weight of resin solids in the clear film-forming composition. The solid resin weight ratio of Ex. A to Ex. C was 75/25 in the clear film-forming composition.

EXAMPLE 7 (Comparative)

A clear film-forming composition was prepared by mixing together the following ingredients:

| Ingredient | Solid weight in grams | Solution weight in grams |
| --- | --- | --- |
| n-amyl propionate | — | 29.5 |
| methyl n-amyl ketone | — | 22.0 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 32.5 | 46.4 |
| carbamate functional acrylic of EXAMPLE C | 32.5 | 49.6 |
| Neutralized DDBSA | 0.55 | 1.8 |

The clear film-forming composition had a hydroxyl value of 52.1 based on total weight of resin solids in the clear film-forming composition. The solid resin weight ratio of Ex. A to Ex. C was 50/50 in the clear film-forming composition.

EXAMPLE 8 (Comparative)

A clear film-forming composition was prepared by mixing together the following ingredients:

| Ingredient | Solid weight in grams | Solution weight in grams |
| --- | --- | --- |
| n-amyl propionate | — | 28.6 |
| methyl n-amyl ketone | — | 22.5 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| hydroxyl functional acrylic of EXAMPLE A | 16.2 | 22.9 |
| carbamate functional acrylic of EXAMPLE C | 48.8 | 74.5 |
| Neutralized DDBSA | 0.55 | 1.8 |

The clear film-forming composition had a hydroxyl value of 35.4 based on total weight of resin solids in the clear film-forming composition. The solid resin weight ratio of Ex. A to Ex. C was 25/75 in the clear film-forming composition.

EXAMPLE 9 (Comparative)

A clear film-forming composition was prepared by mixing together the following ingredients:

| Ingredient | Solid weight in grams | Solution weight in grams |
|---|---|---|
| n-amyl propionate | — | 27.8 |
| methyl n-amyl ketone | — | 23.5 |
| TINUVIN 328 | 1.5 | 1.5 |
| TINUVIN 900 | 1.5 | 1.5 |
| polybutylacrylate | 0.4 | 0.7 |
| TINUVIN 123 | 1.0 | 1.0 |
| CYMEL 1130 | 35.0 | 35.0 |
| carbamate functional acrylic of EXAMPLE C | 65.0 | 99.2 |
| Neutralized DDBSA | 0.55 | 1.8 |

The clear film-forming composition had a hydroxyl value of 19.0 based on total weight of resin solids in the clear film-forming composition. The solid resin weight ratio of Ex. A to Ex. C was 0/100 in the clear film-forming composition.

The film-forming compositions of Examples 1–9 were applied to pigmented basecoats to form color-plus-clear composite coatings over cured electrocoated steel substrates. The basecoats used for examples 1–9 are commercially available from PPG Industries, Inc. and are identified as DCT-6373 (black in color) and DCT-6612 (pumice metallic). The electrocoat used on the steel is commercially available from PPG Industries, Inc. and is identified as ED-5000.

The basecoat was spray applied in two coats to electrocoated steel panels at a temperature of about 75° F. (24° C.). Approximately a 15 second flash time was allowed between the two basecoat applications. After the second basecoat application, a flash time of 5 to 15 minutes was allowed at 75° F. (24° C.) before the application of the clear coating composition. The clear coating compositions of Examples 1–9 were each applied to a basecoated panel in two coats with a ninety second flash at 75° F. (24° C.) allowed between coats. The composite coating was allowed to air flash at 75° F. (24° C.) for 10 minutes before baking at 285° F. (141° C.) to cure both the basecoat and the clearcoat. The panels were baked in a horizontal position. One black and one pumice colored panel for each clearcoat example was baked for 25 minutes and used to test appearance, acid etch resistance, and humidity resistance. In order to test recoat adhesion of the clearcoat examples, a second black colored panel for each clearcoat example was prepared using the identical application procedure described above, however these panels were baked for one hour at 285° F. (141° C.), to cure both the basecoat and the clearcoat. After the hour bake, each panel was allowed to cool, and then the same clearcoat example was reapplied directly to the surface of the first fully-cured clearcoat without sanding or applying an additional layer of basecoat. The panels were then baked for 25 minutes at 285° F. (141° C.) to cure the additional layer of clearcoat. The purpose of the longer bake time on the first coat of basecoat and clearcoat was to increase the severity of adhesion failure between the two separately cured layers of clearcoat. The results for acid etch resistance and recoat adhesion over black basecoat, and appearance and humidity resistance over pumice metallic basecoat are shown in Table 1.

TABLE 1

| Clearcoat Example # | Resin Composition | Acid Etch[1] | 20° Gloss/ DOI[2] | Humidity Resistance[3] Blush/Blisters | Recoat Adhesion[4] |
|---|---|---|---|---|---|
| 1 | acrylic polyol | 8 | 95/82 | 0/none | 5– |
| 2 | 75/25 acrylic polyol/polyester carbamate | 4 | 94/82 | 0/none | 4+ |
| 3 | 50/50 acrylic polyol/polyester carbamate | 3 | 93/89 | 0/none | 5 |
| 4 | 25/75 acrylic polyol/polyester carbamate | 2–3 | 93/85 | 2–3/none | 5 |
| 5 | polyester carbamate | 3 | 91/86 | 2–3/none | 3+ |
| 6 | 75/25 acrylic polyol/acrylic carbamate | 4 | 94/84 | 0/none | 3+ |
| 7 | 50/50 acrylic polyol/acrylic carbamate | 5 | 94/82 | 0/none | 2– |
| 8 | 25/75 acrylic polyol/acrylic carbamate | 2–3 | 93/89 | 0/none | 1 |
| 9 | acrylic carbamate | 4 | 91/90 | 0/none | 0 |

[1]A solution of 350 parts deionized water and 12 parts sulfurous acid was prepared. The acid solution was sprayed onto the panels using a polyethylene spray bottle, giving a distribution of drop sizes up to one quarter inch. Approximately 1.5 grams of solution was applied per 2 × 4 inch panel. The panels were then placed in an oven at 120° F. (49° C.) for twenty minutes. The panels were removed from the oven and the spray/bake procedure was repeated two more times to give a total of 60 minutes at 120° F. (49° C.). After the third cycle the panels were washed with soap and water and dried, then rated for acid etch resistance on a scale of 0–10 based on standard test panels (0 = no observable etch; 10 = severe etching).
[2]20° gloss measured by a Glossgard II glossmeter from Pacific Scientific. DOI (distinction of image) measured using a Dorigon II DOI meter from Hunter Lab.
[3]Ten days exposure at 110° F. on a QCT condensation tester (Q-Panel Company; Cleveland, OH). Panels were rated for blushing and blistering. Blush was rated on a scale of 0 to 5 (0 = no blush or color change, 5 = severe blush or color change.
[4]Recoat adhesion performed on panels containing two separately applied and baked layers of clearcoat as described in the panel preparation section. Adhesion tested using a model P-A-T paint adhesion test kit from Paul N. Gardner Company, Inc. equipped with a multiple tip cutter containing eleven teeth with 1.0 mm spacing. The panels were scribed according to ASTM-3359 and then Scotch Brand "898" tape from 3M Corporation was applied to the scribed area and then removed firmly in attempt to pull any loose paint from the panel. The adhesion was then rated according to ASTM-3359 (0 = no adhesion, 5 = perfect adhesion).

The data summarized in Table 1 shows that the all acrylic polyol system (Ex. 1) although having excellent appearance, humidity resistance, and recoat adhesion, has poor acid etch resistance. Blending the acrylic polyol with polyester carbamate within the range of 75/25 to 25/75 (Examples 2–4) dramatically improves the acid etch resistance while maintaining the other properties shown in the Table 1. When the polyester carbamate level reaches 75% (Ex. 4) and greater (Ex. 5) the humidity resistance suffers. Blending of the acrylic polyol with acrylic carbamate (Examples 6–8) although providing good appearance, humidity resistance, and acid etch resistance results in poor recoat adhesion.

We claim:

1. An adherent film-forming composition comprising:
   (a) 25 to 70 percent by weight of a polymer or oligomer containing repeating ester groups in the polymer or oligomer backbone and containing a plurality of terminal carbamate groups of the structure:

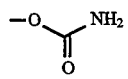

(b) 30 to 75 percent by weight of a hydroxyl functional polymer derived from ethylenically unsaturated monomers; and (c) 25 to 50 percent by weight of an aminoplast crosslinking agent;

the percentages by weight of (a) and (b) being based on total resin solids weight of (a) plus (b); the percentage by weight of (c) being based on total weight of resin solids in the film-forming composition.

2. The film-forming composition of claim 1 in which the percentage by weight of (a) plus (b) is from 25 to 75 percent by weight based on total weight of resin solids in the film-forming composition.

3. The composition of claim 1 in which (a) the polymer or oligomer is a polyester which is the reaction product of an organic polycarboxylic acid or anhydride and a mixture of at least one diol and at least one triol.

4. The composition of claim 3 in which the polyester is prepared from a mixture of at least one diol and at least one triol and the mole ratio of triol to diol is less than 3.3:1.

5. The composition of claim 4 in which the diol is 2,2-dimethyl-3-hydroxypropyl-2,2-dimethyl-3-hydroxypropionate and the triol is trimethylol propane.

6. The film-forming composition of claim 1 in which (a) the polymer or oligomer has an equivalent weight of up to 2500 based on equivalents of terminal carbamate functional groups.

7. The film-forming composition of claim 1 in which (a) the polymer or oligomer has a weight average molecular weight of from 1000 to 30,000, as determined by gel permeation chromatography using polystyrene as a standard.

8. The film-forming composition of claim 1 in which the hydroxyl functional polymer is represented by randomly repeating units according to the following formula:

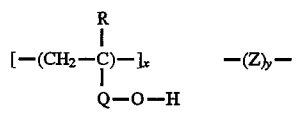

where R is H or CH$_3$; Q is a divalent linking group; Z is a repeating unit derived from one or more polymerizable ethylenically unsaturated monomers; and x, on a weight basis, is 30 to 70 percent and y, on a weight basis, is 30 to 70 percent, with the percentage of x plus y being equal to 100 percent.

9. The hydroxyl functional polymer of claim 8 in which the divalent linking group O is —COO—Q' where Q' is a divalent aliphatic linking group of 2 to 8 carbon atoms.

10. The film-forming composition of claim 1 in which the hydroxyl functional polymer derived from ethylenically unsaturated monomers is a hydroxyl functional acrylic copolymer of one or more hydroxyalkyl esters of acrylic acid or methacrylic acid and one or more other ethylenically unsaturated monomers.

11. The hydroxyl functional acrylic polymer of claim 10 in which the hydroxyalkyl esters of acrylic acid or methacrylic acid are selected from the group consisting of hydroxyethyl acrylate, hydroxyethyl methacrylate, hydroxypropyl acrylate and hydroxypropyl methacrylate.

12. The film-forming composition of claim 1 in which the hydroxyl functional polymer has an equivalent weight of up to 2500 based on equivalents of hydroxyl groups.

13. The film-forming composition of claim 1 in which the hydroxyl functional polymer has a weight average molecular weight of from about 1000 to 30,000 as determined by gel permeation chromatography using polystyrene as a standard.

14. The film-forming composition of claim 1 in which the aminoplast is a condensate of melamine with formaldehyde and an alcohol containing from 1 to 6 carbon atoms.

15. The film-forming composition of claim 14 in which the alcohol is selected from the group consisting of methanol, butanol and mixtures thereof.

16. The film-forming composition of claim 14 in which the aminoplast crosslinking agent is fully alkylated.

17. The film-forming composition of claim 1 which has a hydroxyl value of less than 70 based on total weight of resin solids in the film-forming composition.

18. An adherent clear film-forming composition comprising:

(a) 40 to 60 percent by weight of a polymer or oligomer containing repeating ester groups in the polymer or oligomer backbone and containing a plurality of terminal carbamate groups of the structure:

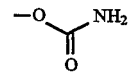

(b) 40 to 60 percent by weight of a hydroxyl functional acrylic copolymer; and (c) 25 to 50 percent by weight of a fully alkylated aminoplast crosslinking agent;

the percentages by weight of (a) and (b) being based on total resin solids weight of (a) plus (b); the percentage by weight of (c) being based on total weight of resin solids in the film-forming composition.

* * * * *

UNITED STATES PATENT AND TRADEMARK OFFICE
CERTIFICATE OF CORRECTION

PATENT NO. : 5,646,214

DATED : July 8, 1997

INVENTOR(S) : Michael A. Mayo

It is certified that error appears in the above-identified patent and that said Letters Patent is hereby corrected as shown below:

Claim 9, column 15, line 54, delete "O" (first occurrence) and insert --Q--; and
Claim 18, column 16, line 46, delete "copolymer;" and insert --polymer;--.

Signed and Sealed this

Sixteenth Day of December, 1997

Attest:

BRUCE LEHMAN

Attesting Officer

Commissioner of Patents and Trademarks